(12) United States Patent
Freeman

(10) Patent No.: US 9,909,430 B2
(45) Date of Patent: Mar. 6, 2018

(54) TURBINE DISK ASSEMBLY INCLUDING SEPERABLE PLATFORMS FOR BLADE ATTACHMENT

(71) Applicant: Rolls-Royce North American Technologies, Inc., Indianapolis, IN (US)

(72) Inventor: Ted J. Freeman, Danville, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 194 days.

(21) Appl. No.: 14/931,479

(22) Filed: Nov. 3, 2015

(65) Prior Publication Data

US 2016/0138407 A1    May 19, 2016

Related U.S. Application Data

(60) Provisional application No. 62/079,338, filed on Nov. 13, 2014.

(51) Int. Cl.
*F01D 5/30* (2006.01)
*F01D 5/28* (2006.01)
(Continued)

(52) U.S. Cl.
CPC ............ *F01D 5/3053* (2013.01); *F01D 5/02* (2013.01); *F01D 5/12* (2013.01); *F01D 5/284* (2013.01); *F01D 5/30* (2013.01); *F01D 5/3023* (2013.01); *F01D 5/3084* (2013.01); *F05D 2220/30* (2013.01); *F05D 2230/64* (2013.01); *F05D 2300/6033* (2013.01); *Y02T 50/672* (2013.01)

(58) Field of Classification Search
CPC . F01D 5/30; F01D 5/32; F01D 5/3023; F01D 5/02; F01D 5/3084; F01D 5/3053; F05D 2300/3033; F05D 2300/6033
See application file for complete search history.

(56) References Cited

U.S. PATENT DOCUMENTS

| 4,494,287 A | 1/1985 | Cruzen et al. |
|---|---|---|
| 5,022,822 A | 6/1991 | Sincere |

(Continued)

FOREIGN PATENT DOCUMENTS

| EP | 2518271 A2 | 10/2012 |
|---|---|---|
| EP | 2642076 A2 | 9/2013 |
| FR | 2962156  * | 6/2012 |

OTHER PUBLICATIONS

Machine Translation of FR 2962156.*
Extended European Search Report for European Application No. 15194384.2-1610, dated Mar. 24, 2016, 7 pages.

*Primary Examiner* — Woody Lee, Jr.
*Assistant Examiner* — Maxime Adjagbe
(74) *Attorney, Agent, or Firm* — Barnes & Thornburg LLP

(57) ABSTRACT

An apparatus includes a disk, an attachment member, and a blade. The disk has an outer surface including a coupling portion. The attachment member has a coupling portion and defines at least a portion of an opening. The coupling portion of the first attachment member is configured to be coupled to the coupling portion of the disk. A portion of the blade is configured to be disposed within the opening when the coupling portion of the attachment member is coupled to the coupling portion of the disk.

18 Claims, 4 Drawing Sheets

(51) Int. Cl.
  *F01D 5/02*    (2006.01)
  *F01D 5/12*    (2006.01)

(56) References Cited

U.S. PATENT DOCUMENTS

| | | |
|---|---|---|
| 5,263,823 A | 11/1993 | Cabaret et al. |
| 5,405,244 A | 4/1995 | Boyd |
| 5,425,622 A | 6/1995 | Murray et al. |
| 7,284,958 B2 | 10/2007 | Dundas et al. |
| 7,832,986 B2 | 11/2010 | Baker et al. |
| 7,874,804 B1 | 1/2011 | Brown |
| 8,206,117 B2 | 6/2012 | Strangman et al. |
| 8,246,310 B2 | 8/2012 | Pierrot et al. |
| 8,282,355 B2 | 10/2012 | Blanchard et al. |
| 8,348,619 B2 | 1/2013 | Derclaye et al. |
| 8,408,874 B2 | 4/2013 | McCaffrey et al. |
| 2010/0150725 A1 | 6/2010 | Krautheim |
| 2012/0003103 A1 | 1/2012 | Tholath |
| 2012/0020796 A1 | 1/2012 | Carre et al. |
| 2013/0064667 A1 | 3/2013 | Campbell et al. |
| 2013/0156590 A1 | 6/2013 | Blanchard et al. |
| 2013/0243601 A1 | 9/2013 | Floyd |

\* cited by examiner

TURBINE DISK ASSEMBLY INCLUDING SEPERABLE PLATFORMS FOR BLADE ATTACHMENT

CROSS REFERENCE TO RELATED APPLICATIONS

This application claims priority to and the benefit of U.S. Provisional Patent Application No. 62/079,338, filed 13 Nov. 2014, the disclosure of which is now expressly incorporated herein by reference.

BACKGROUND

The embodiments described herein relate generally to turbine disk assemblies, and more particularly, to turbine disk assemblies that include ceramic matrix composite (CMC) blades with separable platforms.

Known turbine engines include an air intake portion, a compressor portion, a combustion portion, a turbine portion, and an exhaust portion. Such known turbine engines produce thrust and/or extract energy from a fluid flow by first compressing the intake air within the compressor portion. The compressor portion often includes a series of bladed disks to form a multi-stage, axial compressor. Fuel is added to the compressed air, and the mixture is combusted in the combustion portion. The resulting hot, high-pressure gas is then expanded through the turbine portion to extract energy therefrom. The turbine portion often includes a series of bladed disk assemblies to form a multi-stage turbine.

Many known turbine disk assemblies include a series of turbine blades arranged circumferentially about a rotor or disk. Many known blades are constructed from a nickel alloy, and are secured to the rotor by the root of the blade. Some turbine blades include integral platforms extending circumferentially from both the high and low-pressure sides of the airfoil near the root of the blade. The platforms can function as flow guides to direct the airflow along a desired flow path. In an effort to improve turbine performance, alternative materials have been used in the construction of some known turbine blades. For example, some known turbine blades are constructed from ceramic matrix composite (CMC) materials, which are lighter and can withstand higher temperatures than conventional nickel alloy blades.

Many known CMC blades, however, do not include an integral flow path platform. Thus, the disk assembly may include additional, non-integral flow paths, which can complicate the attachment and/or compromise the effectiveness of the assembly. Moreover, attachment of known CMC blades to the underlying rotor (or disk) can be difficult, for example, due to the dissimilarity in the materials.

Thus, a need exists for an improved turbine disk assemblies with CMC blades, and methods for manufacturing the same.

SUMMARY

Apparatuses, methods, and systems related to turbine disk assemblies having a CMC blade and a separable platform are disclosed herein. In some embodiments, an apparatus includes a disk, an attachment member, and a blade. The disk has an outer surface including a coupling portion. The attachment member has a coupling portion and defines at least a portion of an opening. The coupling portion of the first attachment member is configured to be coupled to the coupling portion of the disk. A portion of the blade is configured to be disposed within the opening when the coupling portion of the attachment member is coupled to the coupling portion of the disk.

DETAILED DESCRIPTION

Figure 1:
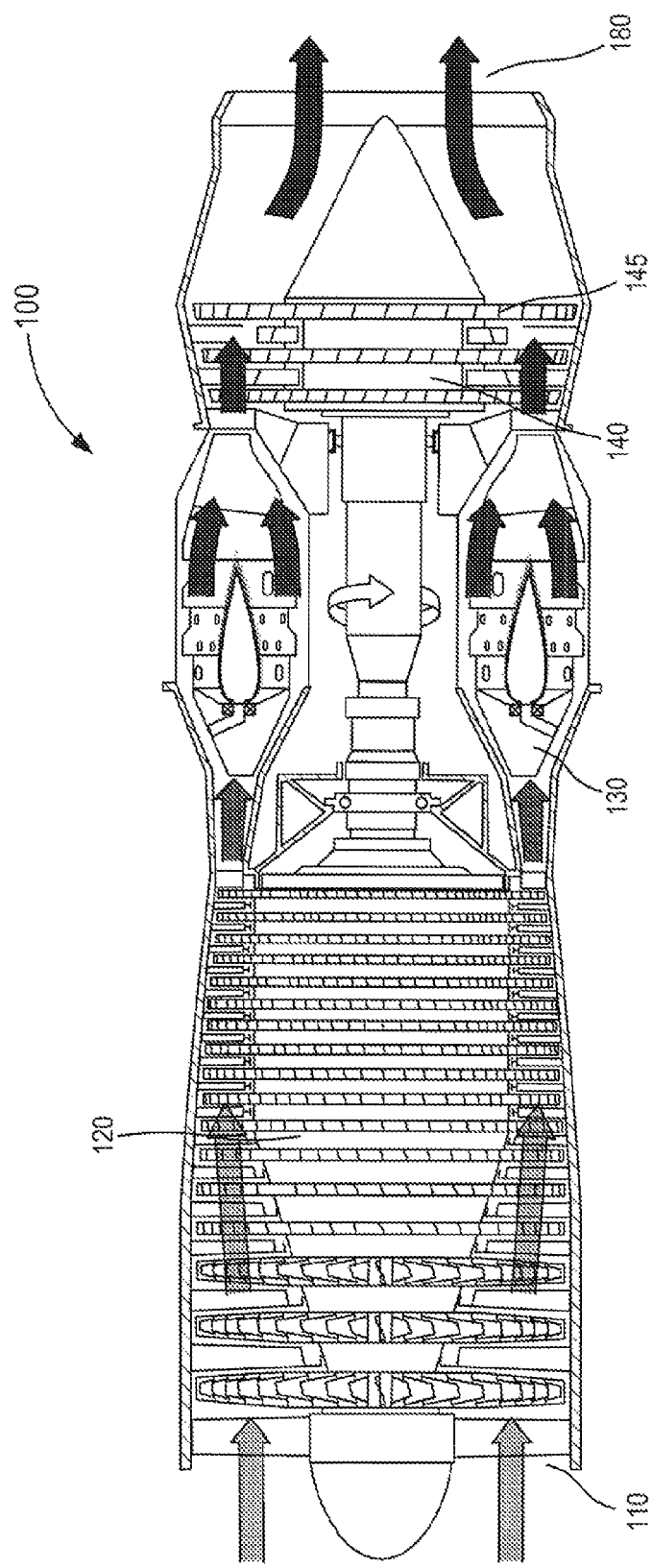
FIG. 1 is a cross-sectional view of a turbine engine and its various components.

Apparatuses, methods, and systems related to turbine disk assemblies having a CMC blade and a separable platform are disclosed herein. In some embodiments, the disk assemblies described herein and/or any portion thereof may be used in a turbine engine (e.g., a jet engine). A jet engine, as described in further detail herein, includes various components, which can form distinct portions of the engine. For example, in some embodiments, a jet engine can include an air intake portion, compressor portion, a combustion portion, a turbine portion, and an exhaust portion. The embodiments and methods described herein can be used, for example, in such turbine portions and/or in such compressor portions.

In some embodiments, an apparatus includes a disk, an attachment member, and a blade. The disk has an outer surface including a coupling portion. The attachment member has a coupling portion and defines at least a portion of an opening. The coupling portion of the first attachment member is configured to be coupled to the coupling portion of the disk. A portion of the blade is configured to be disposed within the opening when the coupling portion of the attachment member is coupled to the coupling portion of the disk such that a root portion of the blade is spaced radially apart from the outer surface of the disk.

In some embodiments, and apparatus includes a disk, a first attachment member, a second attachment member, and a blade. The disk has an outer surface including at least a first coupling portion and a second coupling portion. The first attachment member includes an end portion and a coupling portion. The coupling portion of the first attachment member is configured to be coupled to the first coupling portion of the disk. The second attachment member includes an end portion and a coupling portion. The coupling portion of the second attachment member is configured to be coupled to the second coupling portion of the disk such that the end portion of the first attachment member is at least partially aligned with the end portion of the second attachment member. The end portion of the first attachment member and the end portion of the second attachment member collectively defining an opening configured to receive a portion of the blade.

In some embodiments, a method includes inserting a blade through an opening defined, at least in part, by an attachment member. The attachment member is aligned with an outer surface of a disk such that a coupling portion of the attachment member is aligned with a coupling portion of the disk. The coupling portion of the attachment member is coupled to the coupling portion of the disk such that a root portion of the blade is spaced apart by a distance from the outer surface of the disk.

In some embodiments, an apparatus includes a disk and attachment member, a first blade and a second blade. The disk has an outer surface including a coupling portion. The attachment member has a first end portion, a second end portion, and a coupling portion. The coupling portion of the attachment member configured to be coupled to the coupling portion of the disk. The first end portion of the attachment member defining a portion of a first blade opening, the second end portion of the attachment member defining a portion of a second blade opening. A portion of the first blade is configured to be disposed within the first opening when the coupling portion of the attachment member is coupled to the coupling portion of the disk. A portion of the second blade is configured to be disposed within the second opening when the coupling portion of the attachment member is coupled to the coupling portion of the disk.

As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the value stated. For example, about 0.5 would include 0.45 and 0.55, about 10 would include 9 to 11, about 1000 would include 900 to 1100. Such variances can result from manufacturing tolerances, measurement tolerances, tolerance stacking, and/or other practical considerations (such as, for example, a force exerted on and/or otherwise experienced by a structure). For example, a variance may result from a manufacturing tolerance associated with a given manufacturing process. In such instances, particularly when dealing with very small measurements and/or values (e.g., fractions of an inch), manufacturing tolerances may be plus or minus less than 1%, 2%, 3%, 4%, 5%, 6%, 7%, 8%, 9%, 10%, or more of the stated value.

As used herein, the term "set" can refer to multiple features or a singular feature with multiple parts. For example, when referring to a set of walls, the set of walls can be considered as one wall with multiple portions, or the set of walls can be considered as multiple, distinct walls. Thus, a monolithically constructed item can include a set of walls. Such a set of walls may include multiple portions that are either continuous or discontinuous from each other. A set of walls can also be fabricated from multiple items that are produced separately and are later joined together (e.g., via a weld, an adhesive, or any suitable method).

As used herein, the term "axial direction" refers to, for example, the direction along and/or parallel to an axis of rotation of a component configured to rotate. For example, a disk included in a turbine disk assembly assembly is rotatably movable within the turbine portion of an engine about an axis of rotation generally associated with a center of the disk. Thus, the axial direction refers to a direction parallel to and/or otherwise along the axis of rotation.

As used herein, the terms "tangential direction" or "circumferential direction" can be used interchangeably to refer to, for example, a direction of rotation of a component configured to rotate. For example, the disk included in the turbine disk assembly (described above) is rotatably movable within the turbine portion in a clockwise and/or counterclockwise direction. Thus, a fixed point on the circumference of the disk (i.e., that is tangent to the circumference of the disk) circumscribes the circumference of the disk when rotated 360° about the axis of rotation. Thus, the tangential direction or circumferential direction refers to the direction of rotation.

As used herein, the term "radial direction" refers to, for example, the direction along a radius of a component from a center of the component to an outer surface associated with the circumference or perimeter of the component (or vice versa). For example, the disk included in the turbine disk assembly (described above) includes an outer surface associated with its circumference. Therefore, a radial line extends between the axis of rotation (i.e., the centerline of the disk) to a point along the outer surface (i.e., the surface defining the circumference of the disk). Thus, the radial direction refers to a direction parallel to and/or otherwise along the radial line.

FIG. 1 is a cross-sectional view of a turbine engine 100 according to an embodiment. The engine 100 includes an air intake portion 110, a compressor portion 120, a combustion portion 130, a turbine portion 140, and an exhaust portion 180. The engine 100 can be used in any suitable application, such as, for example, to produce thrust in aircraft applications. In use, air received through the intake portion 110 is compressed within the compressor portion 120. The compressor portion 120 includes a series of bladed disks to form a multi-stage, axial compressor. The compressed air is then mixed with fuel and the mixture is burned in combustion portion 130. The combustion portion 130 can include any suitable fuel injection and combustion mechanisms. The hot, high-pressure gas is then passed through the turbine portion 140 to extract energy from the gas (e.g., to produce thrust).

As shown, the turbine portion 140 includes a series of turbine disk assemblies (or blisks) 145. In this manner, the disk assemblies 145 form a multi-stage turbine. In use, the gas temperatures within the turbine portion 140 can reach temperatures at or above 2000° F., 2450° F. or higher. Moreover, certain components within the turbine portion 140, such as portions of the disk assemblies 145 that define a flow path along which the gas flows, can reach temperatures of between 1600 and 1900° F., and higher, due to the heat transferred from the hot gas. Thus, the material used to form the components of the disk assembly 145 such as the blades, must withstand exposure to an environment of relatively constant high heat (at least while in use). For example, in some embodiments, the disk assemblies 145 can include blades that are constructed from a ceramic matrix composite material. Expanding further, ceramics are often well suited for applications in which a material will be exposed to very high heat, however, ceramics often have mechanical deficiencies such as low ductility and/or yield strength, which in some instances, can lead to crack propagation and/or fracture. Ceramic matrix composites (CMCs), in contrast, are arranged by embedding ceramic fibers in a ceramic matrix, which can overcome the deficiencies that may otherwise be associated with the constituent ceramic base material. Thus, in some embodiments, CMC materials can be used to form, for example, the blades included in the disk assembly 145. In some embodiments, the engine 100 can include any of the disk assemblies described herein.

Figure 2:
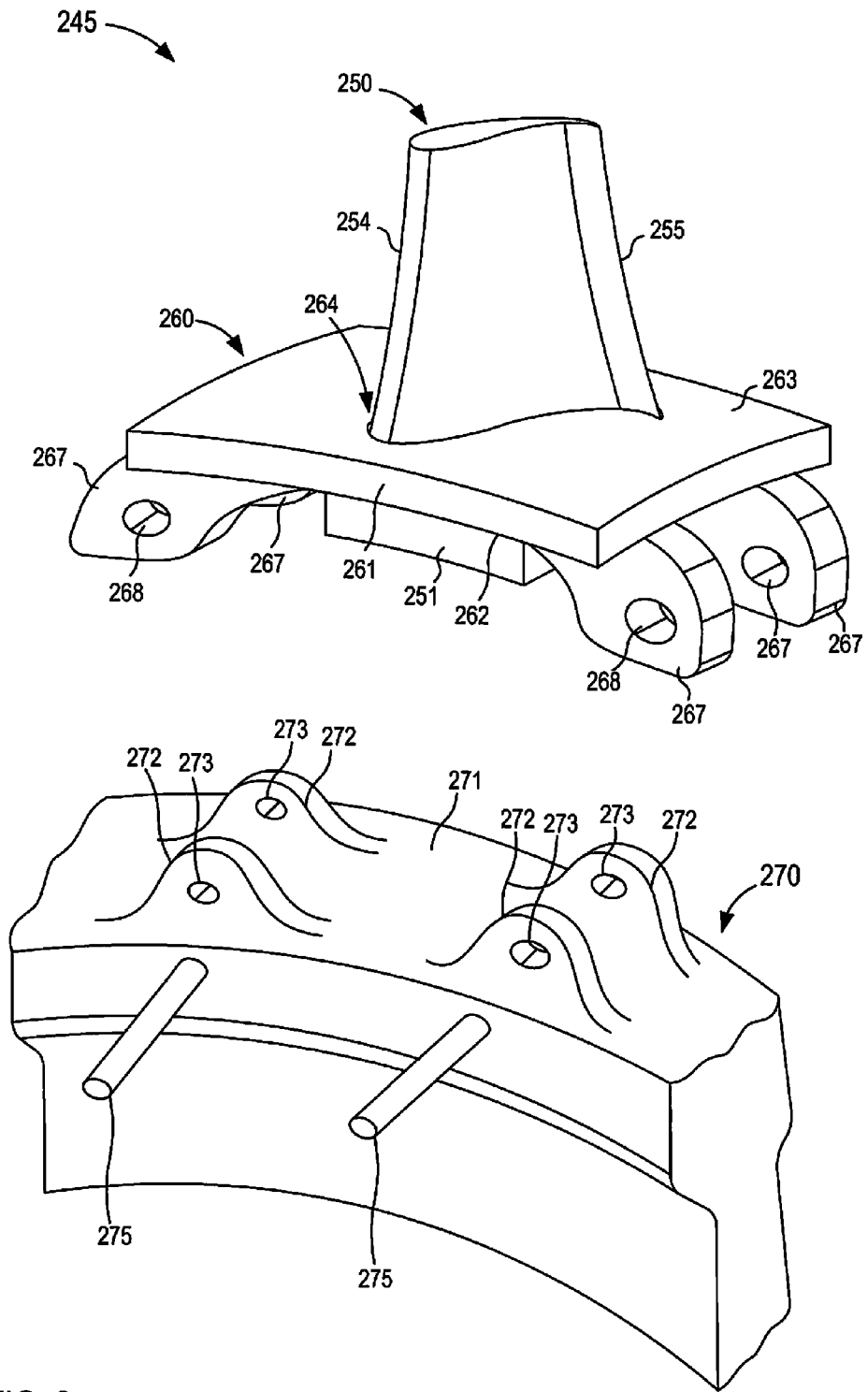
FIG. 2 is an exploded perspective schematic illustration of a turbine disk assembly according to an embodiment.
Figure 3:
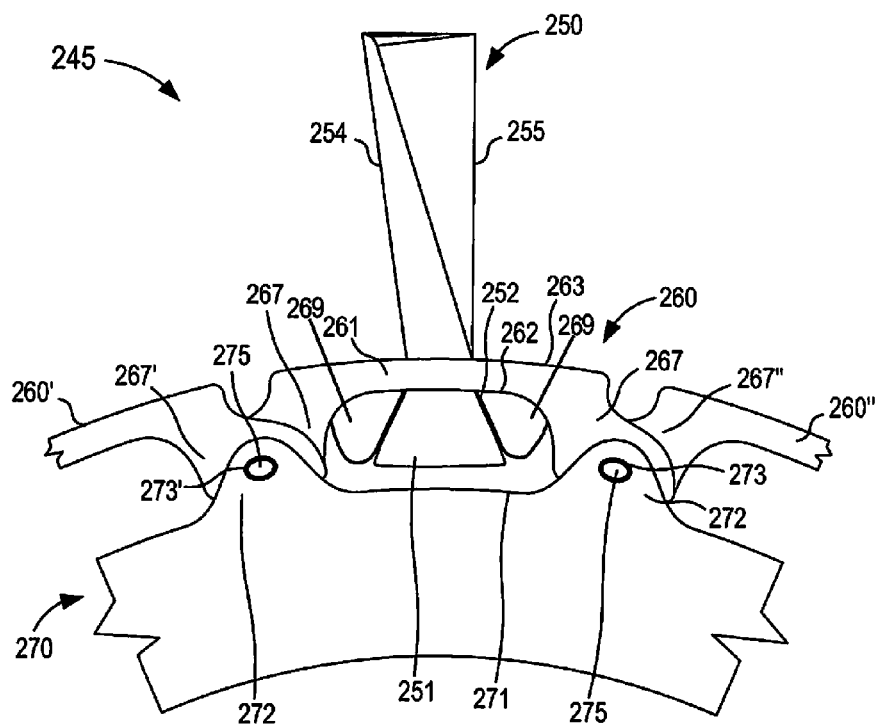
FIG. 3 is a front view of the turbine disk assembly illustrated in FIG. 2.

For example, FIGS. 2 and 3 illustrate a portion of a blade and disk assembly 245, according to an embodiment. The disk assembly 245 can be included, for example, within the engine 100 and/or any other suitable turbomachinery. As shown in FIG. 2, the disk assembly 245 includes a blade 250, an attachment member 260, and a disk 270. The disk 270 includes an outer surface 271 that forms, for example, a circumferential surface. More specifically, although only a portion of the disk assembly 245 is shown in FIGS. 2 and 3, the disk 270 can form a substantially annular ring having an outer diameter associated with the outer surface 271. The outer surface 271 includes a set of coupling portions 272. The coupling portions 272 can be any suitable shape, size, or configuration. For example, in some embodiments, the coupling portions 272 can be lugs, anchors, rings, and/or any other suitable protrusion extending from the outer surface 271. Specifically, as shown in FIG. 2, the coupling portions 272 can be relatively smooth protrusions that extend from the outer surface 271 of the disk 270. Such an arrangement, for example, can reduce stress concentration risers that might otherwise be associated with abrupt discontinuities such as, for example, non-rounded corners or the like.

In this embodiment, the coupling portions 272 are arranged in pairs. For example, the coupling portions 272 form an array of paired coupling portions 272 along the circumference (i.e., the outer surface 271) of the disk 270. Specifically, the two coupling portions 272 forming a pair of coupling members can be disposed at different positions in, for example, the axial direction, while each pair of coupling members can be disposed at different positions in, for example, the tangential or circumferential direction. Moreover, each coupling portions 272 defines an opening 273 configured to receive a retention pin 275, as shown in FIGS. 2 and 3. The arrangement of the paired coupling members is such that the opening 273 defined by a first coupling portion 272 in the pair is substantially aligned with the opening 273 defined by a second coupling portion 272 in the same pair. Thus, a different portion of one retention pin 275 can be disposed within and/or extend through the opening 273 of each coupling portion 272 in that pair.

The attachment member 260 includes a platform 261 having a first (or inner) surface 262 and a second (or outer) surface 263, and defining an opening 264 therethrough. As described in further detail herein, a portion of the blade 250 is disposed within the opening 264 to couple the blade 250 to the attachment member 260, which in turn, is coupled to the disk 270. In other words, the attachment member 260 is operable in coupling the blade 250 to the disk 270. The inner surface 262 of the attachment member 260 includes a set of coupling portions 267. Said another way, the attachment member 260 includes the coupling portions 267 that each extend from the inner surface 262. The coupling portions 267 can be any suitable shape, size, or configuration. For example, as described above with reference to the coupling portions 272 of the disk 270, the coupling members 267 can be relatively smooth protrusions that extend from the inner surface 262 of the attachment member 260. Such an arrangement, for example, can reduce stress concentration risers that might otherwise be associated with abrupt discontinuities such as, for example, non-rounded corners or the like. Moreover, each coupling portion 267 defines an opening 268 configured to receive one of the retention pins 275, thereby coupling the attachment member 260 to the disk 270, as described in further detail herein.

The attachment member 260 and/or the disk 270 (and any of the attachment members and/or disks described herein) can be fabricated from any suitable material. For example, in some embodiments, the attachment member 260 and/or the disk 270 can be constructed from a cast and/or wrought metal alloy. In other embodiments, attachment member 260 and/or the disk 270 can be formed via powder metallurgy (e.g., a process of sintering a blend of metal powders under pressure). In yet other embodiments, the attachment member 260 and/or the disk 270 can be fabricated from a ceramic matrix composite (CMC) material or a monolithic ceramic. Moreover, the surfaces described herein (e.g., the inner surface 262 and/or outer surface 263 of the attachment member 260 and/or the outer surface 271 of the disk 270) can be constructed and/or machined to have any suitable surface properties (roughness, etc.). Similarly, in some embodiments, the surfaces can include any suitable coating and/or can be impregnated with any suitable material(s), which can result in a desired surface property.

As shown in FIGS. 2 and 3, the blade 250 included in the disk assembly 245 has a root portion 251 that has a coupling surface 252. The blade 250 can be constructed from any suitable material, such a ceramic matrix composite (CMC) material. In some embodiments, for example, the blade 250 can be constructed from a ceramic matrix reinforced by a refractory fiber, such as silicon carbide (SiC) fiber (e.g., a SiC—SiC CMC). In other embodiments, the blade 250 can be formed from any suitable ceramic, composite, and/or metallic material or combination thereof.

As described above, a portion of the blade 250 is disposed within the opening 264 of the attachment member 260. More particularly, the blade 250 has a leading edge 254 and a trailing edge 255 and can form any suitable geometric shape and/or contour. Moreover, the cross-sectional shape (e.g., as viewed in the radial direction) of the blade 250 can vary along its length. As shown in FIG. 2, the opening 264 defined by the attachment member 260 has a shape that substantially corresponds to the contour of the blade 250. Thus, the blade 250 can be inserted through the opening 264 of the attachment member 260 to place, for example, the coupling surface 252 of the root portion 251 in contact with a portion of the inner surface 262 of the platform 261 defining the opening 264. In some embodiments, the portion of the inner surface 262 of the platform 261 and the coupling surface 252 of the root portion 251 can form a dovetail attachment or the like. In some embodiments, the inner surface 262 of the platform 261 can include a retention feature (e.g., a protrusion, shaped recess or the like) upon which the coupling surface 252 of the root portion 251 exerts the load during operation of the disk assembly. Such retention feature can correspond to a portion (or similar feature) of the coupling surface 252 and/or the root portion 251 of the blade 250.

In some embodiments, the coupling surface 252 of the root portion 251 form a friction fit or a press fit that is sufficient to couple the blade 250 to the attachment member 260. That is to say, the blade 250 can be inserted through the opening 264 such that the coupling surface 252 is pressed into a portion of the opening 264. Moreover, as shown in FIG. 3, the coupling surface 252 of the root portion 251 is tapered, wherein a cross-sectional area of the coupling surface 252 at position that is closer to the inner surface 262 of the attachment member 260 is smaller than the cross-sectional area of the coupling surface 252 at a position farther from the inner surface 262. As such, as the root portion 251 is pushed into the opening 264, an amount of friction between the coupling surface 252 and the portion of the inner surface 262 defining the opening 264 increases to form a friction fit therebetween. Thus, the friction force can be sufficient to retain the blade 250 in a substantially fixed position relative to the attachment member 260 (i.e., couples the blade 250 to the attachment member 260). In this manner, the blade 250 can be coupled to the attachment member 260 (and therefore the disk 270) without the use of a fixed fastener, welding or brazing.

While the blade 250 is described above as being maintained in a substantially fixed position relative to the attachment member 260, in other embodiments, the coupling of the blade 250 to the attachment member 260 can allow relative motion between the blade 250 and the attachment member 260 and/or disk 270. This arrangement accommodates, inter alia, the thermal expansion of dissimilar materials (e.g., a CMC blade and a metallic disk) and/or the like. Although the blade 250 is described as being coupled within the opening 264 of the attachment member 260 via a friction fit, a press fit, and/or a dovetail joint, in other embodiments, the blades 250 can be coupled within the attachment member 260 using any suitable attachment mechanism. Such attachment mechanisms can include a spherical fitting, a pin fitting, a flat T-type fitting, a bolt, an adhesive, ultrasonic welding, and/or the like or combination thereof.

As described above, with the portion of the blade 250 disposed within the opening 264 of the attachment member 260, the attachment member 260, in turn, can be coupled to the disk 270. More specifically, the attachment member 260 can be positioned adjacent to the outer surface 271 of the disk 270 in such a manner that each coupling portion 267 of the attachment member 260 is adjacent to and aligned with a corresponding coupling portion 272 of the disk 270. Furthermore, the coupling portions 267 of the attachment member 260 can be disposed in a position relative to the coupling portions 272 of the disk 270 such that the openings 268 defined by the coupling portions 267 are substantially aligned with the corresponding opening 273 of the coupling portions 272 of the disk 270. Thus, as shown in FIG. 3, the retention pin 275 can be inserted through the openings 273 and 268 of the coupling portions 272 and 267, respectively, to couple the attachment member 260 to the disk 270. In some embodiments, with the retention pin 275 disposed in the openings 273 and 267, the retention pin 275 can be brazed to a surface of the coupling portions 272 and/or 267. In other embodiments, the retention pin 275 can be press fit within the openings 273 and 268 such that a friction force between a surface defining the openings 273 and 268 and an outer surface of the retention pin 275 is sufficient to maintain the retention pin 275 therein. In still other embodiment, the retention pin 275 can be, for example, a bolt configured to receive a corresponding nut. In such embodiments, this arrangement allows the attachment member 260 and blade 250 to be removed from the disk 270, which can, for example, allow for an attachment member 260 and blade 250 to be removed in the event of damage and/or failure.

In some embodiments, the coupling of the attachment member 260 to the disk 270 is such that an end surface of the root portion 251 is spaced apart from the outer surface 271 of the disk 270 and/or the inner surface 262 of the attachment member 260 by a predetermined distance. This arrangement accommodates variations in tolerance, differing rates of thermal expansion (e.g., between the blade 250 and the disk 270), and/or the like. For example, in some embodiments, the predetermined distance between the end surface of the root portion 251 and the outer surface 271 of the disk 270 (or end clearance when cold and not operating) can be between about 0.002 inches and about 0.005 inches. Thus, this arrangement allows relative motion between the blade 250 and the attachment member 260 and/or disk 270 while maintaining the blades 250, nonetheless, securely coupled to the disk 270.

For example, when the disk assembly 245 rotates, a centrifugal load pulls the blades 250 away from the center of the disk 270 and thus, based at least in part on the arrangement of the coupling surface 252 of the root portion 251 (as described above), more of the root portion 251 of the blade 250 is forced into the opening 264, thereby increasing the friction force between the blade 250 and the attachment member 260. For example, in use, the blade 250 can be exposed to a centrifugal force (e.g., measured as a multiple of earth's gravitational force 9.81 (m/s$_2$), referred to as "G-force" or simply "G") and/or load up to 90,000 G. Although not shown in FIGS. 2 and 3, in some embodiment, the opening 264 can be lined with, and/or the blade 250 can include, a damper configured to minimize vibration associated with the relative movement of the blade 250. In some embodiments, such a damper can, for example, reduce a shock force which might otherwise result in a fracturing of the blade 250 and/or crack propagation within the blade 250.

In some embodiments, the arrangement of the disk assembly 245 can limit the centrifugal loading of the blade 250, the attachment member 260, and/or the disk 270. For example, with the blades 250 inserted into openings 264 in the attachment member 260 and the attachment member 260 coupled to the disk 270 (as described above), a distance between the last continuous fiber of the disk 270 and an end tip of the blade 250 can be minimized. As a result, the disk assembly 245 uses less material and as such, the disk 270 can be made thinner and/or lighter. A thinner and/or lighter disk 270, in addition to using CMC blades 250, decreases the mass of the disk assembly 245. Therefore, with centrifugal force defined as mass times angular-velocity-squared times radius ($F_c = m\omega^2 r$), a reduction in mass decreases the centrifugal load. Furthermore, where the angular velocity is constant (i.e., spinning at a constant rate), a decrease radius (described above) similarly decreases the centrifugal load.

The attachment members 260 each include a pair of engagement portions 269 extending from the inner surface 262 on both sides of the opening 264. The engagement portions 269 can be in contact with the coupling surface 252 of the root portion 251 of the blade 250. Thus, the blade 250 is disposed in the opening 264 and is operably coupled to the disk 370 via a press fit, a friction fit, a dovetail joint, and/or the like formed between the engagement members 269 and the coupling surface 252 of the root portion 251.

Although only a portion of the disk assembly 245 is shown in FIGS. 2 and 3, the disk assembly 245 can include any number of attachment members 260 and blades 270 coupled to the outer surface 271 of the disk 270. For example, as shown in FIG. 3, a second attachment member 260' can be disposed on a first side of the attachment member 260, while a third attachment member 260" can be disposed on a second side of the attachment member 260 opposite the second attachment member 260'. Moreover, the arrangement of the attachment members 260, 260', and 260" can be such that the coupling members 267 disposed at a first end of the attachment member 260 are coupled to the coupling members 267' disposed at a second end of the second attachment member 260', which are in turn, coupled to the same pair of coupling portions 272 of the disk 270. Similarly, the coupling members 267 disposed at a second end of the attachment member 260 are coupled to the coupling members 267" disposed at a first end of the third attachment member 260", which are in turn, coupled to the same pair of coupling portions 272 of the disk 270. In other words, the coupling portions 267 disposed on respective abutting sides of adjacent attachment members 260 are each coupled to a single pair of coupling portions 272 (described above) of the disk 270. In this manner, a set of attachment members 260 and the corresponding blades 250 can circumscribe the circumference of the disk 270.

Moreover, in some embodiments, the arrangement of the second surface 263 of the platform 261 of each attachment member 260 can define a fluid flow path along which heated gas from, for example, the combustion portion 130 of the engine 100, can flow. Specifically, the second surface 263 of the platforms 261 of each attachment member 260 collectively form, for example, a fluid flow ring that is spaced apart from the outer surface 271 of the disk 270. As such, the fluid flow ring can define the fluid flow path along which the heated gas can flow. In some embodiments, the fluid flow ring can be such that the outer surface 271 of the disk 270 is substantially fluidically isolated from the fluid flow path. As such, in some such instances, the disk 270 is exposed to an amount of heat or thermal energy that is less that an amount of heat or thermal energy to which the attachment members 260 are exposed. In this manner, fatigue of the disk 270 resulting from repeated thermal expansion and/or contraction can be reduced. In some embodiments, limiting the heat exposed to the disk 270 can allow the disk 270 to be fabricated from a material with a lower melting point, which in some embodiments, maybe result in additional cost and/or weight reductions. In some embodiments, the platform 261 of each attachment member 260 can extend over at least a portion of the coupling portions 267 such that a distance between the platforms 261 of adjacent attachment members 270 can be minimized, which can, for example, be sufficient to substantially fluidically isolate the disk 270 from the flow path defined by the second surfaces 263 of the attachment members 260.

Although shown as being coupled by the retention pins 275, in other embodiments, the attachment members 260 or a flow path ring (which is formed by the series of attachment members 260) can be coupled to the disk 270 to form the disk assembly 245 in any suitable manner. For example, in some embodiments, the attachment member 260 can be coupled to the disk 270 by a bonding or braze joint. In this manner, the disk 270 can support and/or carry at least a portion of the centrifugal load that is imparted onto the ring 260 by the blades 250 during use. More particularly, this arrangement can limit centrifugal (or "CF") loading during operation of the disk assembly 245. Because the blades 250 are inserted into openings 264 in the attachment member 260, which is, in some embodiments, bonded to the disk 270, no additional attachment is used to mount the blades 250. Thus, the distance between the last continuous fiber of the outer surface 271 of the disk 270 and/or the outer surface 263 of the attachment member 260 and the tips of the blades 250 (not shown) can be minimized. As a result, less material is carried by the disk assembly, and thus the disk 270 can be thinner and lighter. Moreover, in some embodiments, the blades 250 can be CMC blades, which further reduce the mass of the disk assembly 245. Because the CF force is a function of the mass, a reduction in mass will decrease the CF load.

Figure 4:
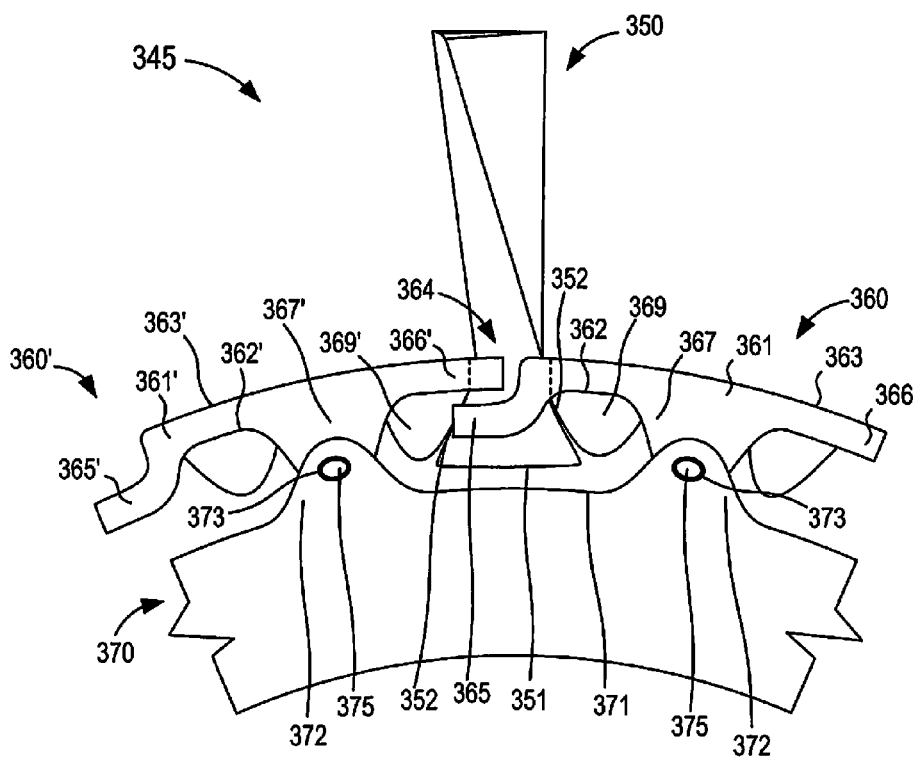
FIG. 4 is a front view of a turbine disk assembly, according to another embodiment.

Although the attachment member 260 is shown and described as defining one complete opening 264 through which the blade 250 is inserted, in other embodiments, adjacent attachment members disposed about a disk can collectively define an opening through which a blade can be inserted. For example, FIG. 4 illustrates a disk assembly 345 according to another embodiment. The disk assembly 345 can be any suitable shape, size, or configuration. For example, in some embodiment, the disk assembly 345 can be used in the turbine portion 140 of the engine 100. Moreover, portions of disk assembly 345 can be substantially similar to corresponding portions of the disk assembly 245, described in detail above. Thus, aspects of the disk assembly 345 that are substantially similar to those described above with reference to the disk assembly 245 are not described in further detail herein.

As shown in FIG. 4, the disk assembly 345 includes a blade 350, a first attachment member 360, a second attachment member 360', and a disk 370. The disk 370 includes an outer surface 371 with an array of coupling portions 372. The coupling portions 372 each define an opening 373. As described above with reference to the disk 270, the coupling portions 372 can be arrayed along the circumference of the disk 370 in pairs of tangentially or circumferentially aligned coupling portions 372. In a similar manner, the blade 350 includes a root portion 351 having a coupling surface 352 and as such, can be the same in form and function as the blade 250, described above with reference to FIGS. 2 and 3.

The disk assembly 345 differs from the disk assembly 245, however, in the arrangement and configuration of the attachment members 360 and 360'. For example, as shown in FIG. 4, the first attachment member 360 includes a platform 361 having an inner surface 362 and an outer surface 363. The platform 361 also has a first end portion 365 and a second end portion 366, and a coupling portion 367 extending from the inner surface 362. More specifically, the coupling portion 367 is disposed between the first end portion 365 and the second end portion 366. The second attachment member 360' is substantially the same as the first attachment member 360 and thus, includes an inner surface 361', and outer surface 362', a first end portion 365', a second end portion 366', and a coupling portion 367'. As such, a detailed discussion of the first attachment member 360' similarly applies to the second attachment member 360' and therefore, the second attachment member 360' is not described in further detail herein.

As shown in FIG. 4, the first end portion 365 of the first attachment member 360 includes and/or otherwise forms a bend, a hook, a dogleg, a shelf, etc. More specifically, the outer surface 363 of the platform 361 forms a substantially constant radius extend from the second end portion 366 to the first end portion 365. The arrangement of the first end portion 365, however, is such that the first end portion 365 forms a radius that is smaller than the remaining portions of the first attachment member 360. Thus, the first end portion 365 defines, for example, a dogleg or the like.

While the attachment member 260 included the set of coupling members 267 extending from opposite end of the platform 261, in this embodiment, the first attachment member 360 can include a single set of coupling portions 367 that are tangentially aligned along the inner surface 362 of the platform 361 (as such, with FIG. 4 being a front view of the disk assembly 345, only one coupling portion 367 is shown, with the second coupling portion being disposed directly behind the other). Moreover, although not shown in FIG. 4, the coupling portions 367 each define an opening configured to receive a retention pin 375. In this manner, the first attachment member 360 can be disposed adjacent to the outer surface 371 of the disk 370 such that the openings described by the coupling members 367 of the first attachment member 360 are aligned with the openings 373 defined by the coupling members 372 of the disk 370. Thus, the retention pin 375 can be inserted through each opening to couple the first attachment member 360 to the disk 370 in a similar manner as described above with reference to the attachment member 260 and disk 270.

As shown in FIG. 4, the second attachment member 360' can be coupled to the pair of coupling portions 372 adjacent to the pair of coupling portions 372 coupled to the first attachment member 360. The arrangement of the first attachment member 360 and the second attachment member 360', when coupled to the disk 370, is such that at least a portion of the second end portion 366' of the second attachment member 360' matingly engages with (e.g., overlaps, stacks, parallels, etc.) the first end portion 365 of the first attachment member 360, as shown in FIG. 4. Similarly stated, the arrangement of the first end portion 365 of the first attachment member 360 forming the dogleg or the like, is such that the first end portion 365 of the first attachment member 360 is disposed in a position that is radially inward to the second end portion 366' of the second attachment member 360'. Said another way, the first end portion 365 of the first attachment member 360 is disposed at a first distance from the outer surface 371 of the disk 370 when coupled thereto, while the second end portion 366' of the second attachment member 360' is disposed at a second distance, greater than the first distance, from the outer surface 371 of the disk 370 when the second attachment member 360' is coupled thereto.

As shown in FIG. 4, the arrangement of the attachment members 360 and 360' is such that when coupled to the disk 370, the first end portion 365 of the first attachment member 360 and the second end portion 366' of the second attachment member 360' collectively define an opening 364 configured to receive a portion of the blade 350. For example, in some embodiments, the first end portion 365 of the first attachment member 360 can define a recessed and/or contoured surface. Thus, the first attachment member 360 can be coupled to the disk 370 (as described above) and a portion of the blade 350 can be positioned within a recess defined by the recessed and/or contoured surface of the first end portion 365. The second attachment member 360' can then be coupled to the disk 370 (as described above) such that the second end portion 366' of the second attachment member 360' overlaps and/or aligns with the first end portion 365 of the first attachment member 360.

The second end portion 366' of the second attachment member 360' defines a recessed and/or contoured surface that is substantially aligned with the recessed and/or contoured surface of the first end portion 365 of the first attachment member 360. Thus, the first end portion 365 of the first attachment member 360 and the second end portion 366' of the second attachment member 360' collectively define the opening 364 through which the blade 350 extends. Furthermore, as shown in FIG. 4, the attachment members 360 and 360' each include a pair of engagement portions 369 and 369' extending from the inner surface 362 on both sides of the coupling portions 367 and 367', respectively. The engagement portions 369 and 369' can be in contact with the coupling surface 352 of the root portion 351 of the blade 350. Thus, the blade 350 is disposed in the opening 364 collectively defined by the first attachment member 360 and the second attachment member 360' and operably coupled to the disk 370 in a similar manner as described above with reference to the disk assembly 245 (i.e., a press fit, a friction fit, a dovetail joint, and/or the like formed between the engagement members 369 and 369' and the coupling surface 352 of the root portion 351). In this manner, any suitable number of attachment members and blades can be coupled to the outer surface 371 to substantially circumscribe the circumference of the disk 370 (as described in detail above with reference to the disk assembly 245).

In use, the force exerted by a first blade on one of the attachment members (e.g., the first attachment member 360 and the second attachment member 360') can be balanced by a force exerted by a second blade on the attachment member. Specifically, the outward force exerted by the blade 350 on the first end portion 365 of the coupling member 360 can be balanced by the force exerted by an adjacent blade (not shown in FIG. 4) on the second end portion 366' of the coupling member 360. Thus, the location and/or geometry of the opening 364, as well as the coupling opening 373 (e.g., relative to the first end portion 365 and the second end portion 366) can be configured to facilitate a force balance. In this manner, the angular position of the platforms (e.g., about an axis of the coupling opening 373) can be maintained such that the coupling members 360, 360' collectively form, in some embodiments, a continuous outer surface.

Expanding further, in some embodiments, the arrangement of the second surfaces 363 and 363' of the platforms 361 and 361', respectively, (and the outer surfaces of any other attachment member(s), not sown in FIG. 4, which are similarly arranged such that the attachment members substantially circumscribe the disk 370) can define a fluid flow path along which heated gas from, for example, the combustion portion 130 of the engine 100, can flow. Specifically, the second surfaces (including the second surfaces 363 and 363') of each attachment member (including the attachment members 360 and 360', respectively) collectively form, for example, a fluid flow ring that is spaced apart from the outer surface 371 of the disk 370. As such, the fluid flow ring can define the fluid flow path along which the heated gas can flow. In some embodiments, the fluid flow ring can be such that the outer surface 371 of the disk 370 is substantially fluidically isolated from the fluid flow path. As such, in some such instances, the disk 370 is exposed to an amount of heat or thermal energy that is less that an amount of heat or thermal energy to which the attachment members 360 and 360' (and any other attachment member not shown in FIG. 4) are exposed.

Figure 5:
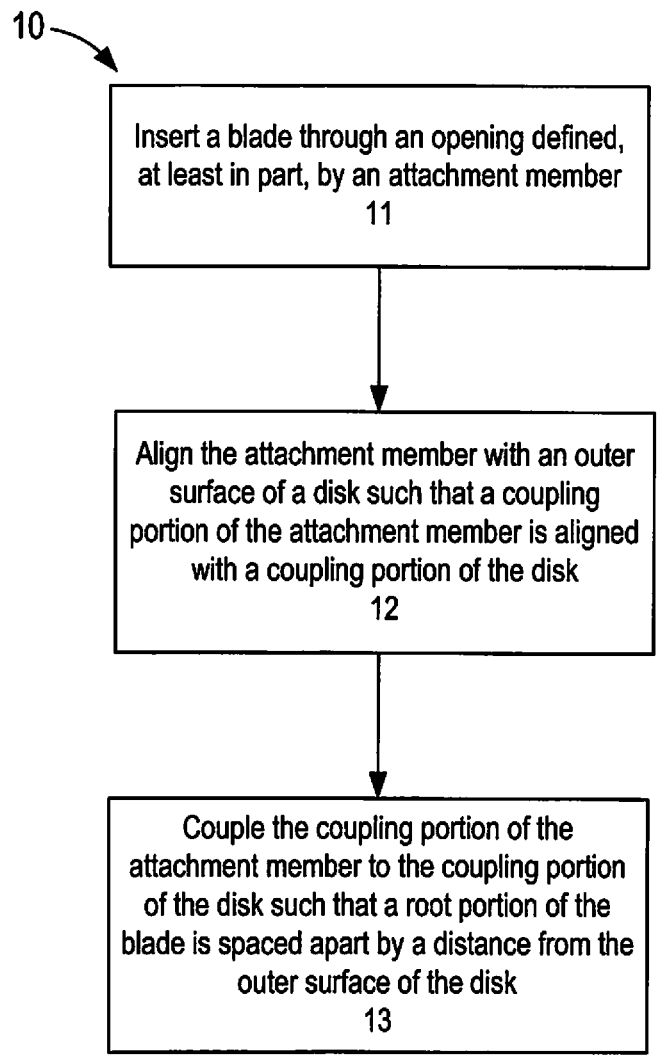
FIG. 5 is a flow chart of a method for assembling a turbine disk assembly according to an embodiment.

Referring now to FIG. 5, a flow chart is shown illustrating a method 10 of assembling a disk assembly according to an embodiment. Although the method is described primarily with respect to the disk assembly 245, the method 10 is not limited to the assembly of the disk assembly 245 and can apply to the disk assembly 345, and/or any other suitable disk assembly. The method 10 includes inserting a blade through an opening defined at least in part by an attachment member such that a root of the blade is matingly disposed within the opening, at 11. The blade can be any of the blades described herein, such as the blade 250 (e.g., a CMC blade) and the attachment member can be any suitable attachment member, such as the attachment members 260 and/or 360. More specifically, in some embodiments, the attachment member can be substantially similar to the attachment 260 described above and thus, can define the opening through which the blade is inserted. In other embodiments, the attachment member can be substantially similar to the attachment member 360. In such embodiments, the opening through which the blade is inserted can be collectively defined by adjacent attachment members.

The attachment member(s) and the blade are then aligned with an outer surface of the disk such that a coupling portion of the attachment member(s) is aligned with a corresponding coupling portion of the disk, at 12. The disk can be any suitable disk, such as the disk 270 and/or 370 described herein. In some embodiments, the alignment of the coupling portions of the attachment member(s) and the coupling portions of the disk can be such that an opening defined by each of the aligned coupling portions are similarly aligned. With the coupling portions of the attachment member(s) aligned with its corresponding coupling portion of the disk, the coupling portion of the attachment member(s) are coupled to the corresponding coupling portion of the disk such that a root portion of the blade is spaced apart by a distance from the outer surface of the disk, at 13. For example, in some embodiments, a retention pin or the like can be inserted the openings of the aligned coupling portions to couple the attachment member(s) to the disk.

In some embodiments, the arrangement of the opening through which the blade is inserted can be such that the root portion is (1) spaced apart from the outer surface of the disk and (2) partially movable relative to the attachment member(s), for example, in response to a centrifugal force during use. In some embodiments, multiple attachment members are coupled to the disk to substantially circumscribe the disk. In such embodiments, the attachment members can collective form, for example, a fluid flow ring that is spaced apart from the outer surface of the disk. Moreover, such a fluid flow ring can define a fluid flow path along which a heated gas (e.g., received from the combustion portion 130 of the engine or the like) can flow. In some embodiments, the fluid flow ring can be such that the outer surface of the disk is substantially fluidically isolated from the fluid flow path. Thus, an amount of thermal energy to which the outer surface of the disk is exposed can be reduced. In this manner, thermal expansion or contraction of the disk (based at least in part on the constituent metal used to form the disk being exposed to the thermal energy) can be reduced, which in turn, can reduce fatigue or the like of the disk.

While various embodiments have been described above, it should be understood that they have been presented by way of example only, and not limitation. Where schematics and/or embodiments described above indicate certain components arranged in certain orientations or positions, the arrangement of components may be modified, which in some instances, can allow for additional usage thereof. For example, although the disk assemblies have been described herein as being turbine disk assemblies, in other embodiments, any of the structures and methods described herein can be used to form a disk assembly used in conjunction with a compressor wheel or disk assembly.

While the embodiments have been particularly shown and described, it will be understood that various changes in form and details may be made. For example, while the retention pins 375 are shown in FIG. 4 as having an oblong cross-sectional shape, in other embodiments, a disk assembly can include retention pins having any suitable cross-sectional shape. For example, in some embodiments, a retention pin can have a circular cross-sectional shape, a polygonal cross-sectional shape, or the like. Although various embodiments have been described as having particular features and/or combinations of components, other embodiments are possible having a combination of any features and/or components from any of embodiments as discussed above. For example, in some embodiments, there may be a damper between the attachment member 260 and the blade 250 to minimize vibration.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine disk assembly adapted for use in a gas turbine engine, the assembly comprising
a disk having an outer surface, the outer surface including a coupling portion;
an attachment member having a coupling portion and defining at least a portion of an opening, the coupling portion of the attachment member configured to be coupled to the coupling portion of the disk; and
a blade, a portion of the blade configured to be disposed within the opening when the coupling portion of the attachment member is coupled to the coupling portion of the disk,
wherein the opening is defined by a single attachment member,
wherein the attachment member includes a platform and a pair of engagement portions extending inward in a radial direction on both sides of the opening from the platform and the engagement portions are configured block a root portion of the blade from movement through the opening.

2. The assembly of claim 1, wherein the attachment member is one of a plurality of attachment members and the plurality of attachment members collectively defining a fluid flow path, the fluid flow path being fluidically isolated from the outer surface of the disk.

3. The assembly of claim 1, wherein the coupling portion of the attachment member defines an opening configured to be aligned with an opening defined by the coupling portion of the disk, the apparatus further comprising:
a retention pin, the retention pin configured to be inserted though the opening defined by the coupling portion of the attachment member and the opening defined by the coupling portion of the disk to couple the attachment member to the disk.

4. The assembly of claim 1, wherein the blade is formed from a ceramic matrix composite (CMC) material.

5. The assembly of claim 4, wherein the attachment member is formed from a ceramic matrix composite (CMC) material.

6. The assembly of claim 1, wherein the blade is disposed in the opening and is operably coupled to the disk via a dovetail joint formed between the engagement portions and the root portion of the blade.

7. The assembly of claim 6, wherein the opening is defined through the platform of a single attachment member.

8. The assembly of claim 1, wherein the attachment member is a first attachment member including a first end portion and a second end portion, the coupling portion of the disk being a first coupling portion, the apparatus further comprising:
a second attachment member including a first end portion, a second end portion, and a coupling portion, the second attachment member configured to be coupled to a second coupling portion of the disk such that the first end portion of the first attachment member is aligned with the second end portion of the second attachment member, the first end portion of the first attachment member and the second end portion of the second attachment member collectively defining the opening.

9. A turbine disk assembly adapted for use in a gas turbine engine, the assembly comprising
a disk having an outer surface, the outer surface of the disk including at least a first coupling portion and a second coupling portion;
a first attachment member, the first attachment member having an end portion and a coupling portion, the coupling portion of the first attachment member configured to be coupled to the first coupling portion of the disk;
a second attachment member, the second attachment member having an end portion and a coupling portion, the coupling portion of the second attachment member configured to be coupled to the second coupling portion of the disk such that the end portion of the first attachment member is at least partially aligned in an overlapping manner with the end portion of the second attachment member, the end portion of the first attachment member and the end portion of the second attachment member collectively defining an opening; and a blade, a portion of the blade configured to be disposed within the opening when the coupling portion of the first attachment member is coupled to the first coupling portion of the disk and the coupling portion of the second attachment member is coupled to the second coupling portion of the disk.

10. The assembly of claim 9, wherein the end portion of the first attachment member is spaced apart from the outer surface of the disk by a first distance, the end portion of the second attachment member is spaced apart from the outer surface of the disk by a second distance greater than the first distance.

11. The assembly of claim 9, wherein the coupling portion of the first attachment member defines an opening configured to be aligned with an opening defined by the first coupling portion of the disk, and the coupling portion of the second attachment member defines an opening configured to be aligned with an opening defined by the second coupling portion of the disk, the apparatus further comprising:

a first retention pin, the first retention pin configured to be inserted though the opening defined by the coupling portion of the first attachment member and the opening defined by the first coupling portion of the disk to couple the first attachment member to the disk; and a second retention pin, the second retention pin configured to be inserted though the opening defined by the coupling portion of the second attachment member and the opening defined by the second coupling portion of the disk to couple the second attachment member to the disk.

12. The assembly of claim 9, wherein the end portion of the second attachment member is a first end portion, the blade is a first blade and the opening collectively defined by the end portion of the first attachment member and the first end portion of the second attachment member is a first opening, the apparatus further comprising:

a third attachment member, the third attachment member having an end portion and a coupling portion, the coupling portion of the third attachment member configured to be coupled to a third coupling portion of the disk such that a second end portion of the second attachment member is at least partially aligned with the end portion of the third attachment member, the second end portion of the second attachment member and the end portion of the third attachment member collectively defining a second opening; and a second blade, a portion of the second blade configured to be disposed within the second opening when the coupling portion of the second attachment member is coupled to the second coupling portion of the disk and the coupling portion of the third attachment member is coupled to the third coupling portion of the disk.

13. The assembly of claim 9, wherein the first attachment member and the second attachment member collectively define at least a portion of a fluid flow path.

14. A method of constructing a turbine disk assembly, the method comprising inserting a blade through an opening, at least a portion of the opening being defined by an attachment member;

aligning the attachment member with an outer surface of a disk such that a coupling portion of the attachment member is aligned with a coupling portion of the disk; and coupling the coupling portion of the attachment member to the coupling portion of the disk, and wherein the coupling positions an end of root of the blade inserted through the opening in spaced apart relation to the outer surface of the disk defining a clearance between the end of the root and the outer surface of the disk permitting movement of the blade relative to the outer surface of the disk and the attachment member in response to centrifugal forces.

15. The method of claim 14, wherein the opening is defined by a single attachment member.

16. The method of claim 14, wherein the coupling portion of the attachment portion is aligned with the coupling portion of the disk such that an opening defined by the coupling portion of the attachment member is aligned with an opening defined by the coupling portion of the disk; and the coupling of the attachment member to the disk includes inserting a retention member through the opening defined by the coupling portion of the attachment member and the coupling portion of the disk.

17. The method of claim 14, wherein the attachment member is a first attachment member including an end portion and the method further comprises disposing the first attachment member adjacent to a second attachment member such that the end portion of the first attachment member is aligned with an end portion of the second attachment member, the end portion of the first attachment member and the end portion of the second attachment member collectively defining the opening.

18. The method of claim 14, wherein the attachment member includes a first end portion and a second end portion, the attachment member being a first attachment member, and the method further comprises disposing the first attachment member adjacent to a second attachment member including a first end portion and a second end portion such that the second end portion of the second attachment member at least partially overlaps the first end portion of the first attachment member, the first end portion of the first attachment member and the second end portion of the second attachment member collectively defining the opening, the blade being inserted through the opening such that the root portion is disposed on a side of the first end portion of the first member opposite the second end portion of the second member.

* * * * *